US009522449B2

(12) United States Patent
Nietzel et al.

(10) Patent No.: US 9,522,449 B2
(45) Date of Patent: Dec. 20, 2016

(54) METHOD AND SYSTEM FOR CUSTOMIZING A DOOR COLLAR LOCK (71) Applicants: Daniel Anthony Nietzel, Muscatine, IA (US); Jame Charles Hayes, Wilton, IA (US); Edwin Felix Colon, Muscatine, IA (US); John Harold Lawrence, Muscatine, IA (US); Michael Jon Morgan, Muscatine, IA (US)

(72) Inventors: Daniel Anthony Nietzel, Muscatine, IA (US); Jame Charles Hayes, Wilton, IA (US); Edwin Felix Colon, Muscatine, IA (US); John Harold Lawrence, Muscatine, IA (US); Michael Jon Morgan, Muscatine, IA (US)

( * ) Notice: Subject to any disclaimer, the term of this patent is extended or adjusted under 35 U.S.C. 154(b) by 0 days.

(21) Appl. No.: 14/453,291

(22) Filed: Aug. 6, 2014

(65) Prior Publication Data

US 2016/0039057 A1   Feb. 11, 2016

(51) Int. Cl.
*B23P 19/04*   (2006.01)
*E05F 3/22*   (2006.01)
*E05F 1/00*   (2006.01)

(52) U.S. Cl.
CPC .................. *B23P 19/04* (2013.01); *E05F 3/22* (2013.01); *E05F 1/00* (2013.01); *Y10T 29/49764* (2015.01); *Y10T 29/49771* (2015.01); *Y10T 29/53004* (2015.01); *Y10T 29/53013* (2015.01)

(58) Field of Classification Search
CPC .............. B23P 19/04; E05F 3/22; E05F 1/00; Y10T 29/53013; Y10T 29/49771; Y10T 29/53004; Y10T 29/49764
See application file for complete search history.

(56) References Cited

U.S. PATENT DOCUMENTS 8,756,759 B2 *   6/2014   Kaestle ..................... E05F 3/22
                                                                                16/49

* cited by examiner

*Primary Examiner* — John C Hong
(74) *Attorney, Agent, or Firm* — Jacque R. Wilson; Carson Boxberger LLP (57) ABSTRACT A method for creating a customized apparatus for holding a door closed comprises comparing a physical door hydraulic piston to two or more diagrammatic configurations to determine which of two or more computer aided design templates to use in fabrication. A straight arm of the physical door hydraulic piston is measured to produce a measurement M1. A user measures from the outside edge of the straight arm to an outside edge of an angled arm of the hydraulic piston to produce a measurement M2. A user measures a width of a pivot point of the hydraulic piston to produce a measurement M3. A user measures the collective height of the straight arm and the angled arm to produce a measurement M4. A user selects one of the templates from the two or more templates based on the comparing step. A CAD operator enters measurements M1, M2, M3 and M4 into the selected template to produce fabrication specifications. Based on the fabrication specifications, a customized apparatus is fabricated for holding a door closed.

9 Claims, 9 Drawing Sheets

METHOD AND SYSTEM FOR CUSTOMIZING A DOOR COLLAR LOCK

CROSS REFERENCE TO RELATED APPLICATIONS

This is a continuation-in-part of currently pending U.S. patent application Ser. No. 14/244,091, entitled "DOOR COLLAR LOCK", filed Apr. 3, 2014, which is a continuation-in-part of abandoned U.S. patent application Ser. No. 14/099,912, entitled "DOOR COLLAR LOCK", filed Dec. 7, 2013.

FIELD OF THE INVENTION

The present invention generally relates to a door collar lock. More specifically, the invention relates to a system and method for securing a door in a closed position using a door collar locking device.

BACKGROUND OF THE INVENTION

The use of door closing mechanisms having a rod and associated piston operating within a cylinder is well known. For instance, in residential applications, it is well known to connect such a mechanism between the door and its frame to act as a shock absorber or dampener against the action of a closing force such as a spring or a partial vacuum within the cylinder.

It has been known to provide different types of stops in conjunction with such closing mechanisms, which allow the door to be closed only partially, thereby temporarily maintaining the door in the desired position against the closing force. One of the more common types of prior art devices consists of a stop washer mounted on the piston rod. The washer is wedged between the rod and the cylinder to prevent the rod from being drawn in to the cylinder.

While different ways of temporarily keeping a door having a pneumatic piston and rod mechanism open have been contemplated and made available, few systems have focused on keeping a door with a pneumatic piston and rod closed for emergency purposes.

Recent tragic events such as those at Sandy Hook Elementary School in Connecticut, Columbine High School, and other locations, have prompted discussions on ways to improve security in schools and in other venues. In some instances, due to fire code regulations, and the like, the use of door locks may be disallowed. Still, even door locks may be vulnerable to forced entry because typical door locks are easily kicked-in or pushed open by blunt and sudden force.

Therefore, there is still a need for a system and method that overcomes the shortcomings of the above-mentioned prior art. The system and method described herein provides such a system and method by preventing opening of a door with a pneumatic piston and rod mechanism.

SUMMARY OF THE INVENTION

According to a preferred embodiment, an apparatus for holding a door closed, comprising: a top panel; a left wall; a right wall; a flap attached to the left wall opposite the top panel and folded under the apparatus; a flap attached to the right wall opposite the top panel and folded under the apparatus; a front end; a back end; and an opening at the front end that has a larger cross section than a cross section of the back end thereby providing for a tapered shape of the apparatus overall, such that the apparatus is configured to fit over two hinged arms of a door closing system, preventing the arms from articulating open to prevent the door from opening.

According to another preferred embodiment, a door collar lock, comprising: a top panel; a left wall; a right wall; a front end; a back end; a flap attached to the left wall opposite the top panel and folded under the apparatus; a flap attached to the right wall opposite the top panel and folded under the apparatus; and an opening at the front end that has a larger cross section than a cross section of the back end thereby providing for a tapered shape of the door collar lock overall, such that the door collar lock is configured to fit over two hinged arms of a door closing system, preventing the arms from articulating open to prevent the door from opening.

According to another preferred embodiment, a method for creating a customized apparatus for holding a door closed, comprising comparing a physical door hydraulic piston to two or more diagrammatic configurations to determine which of two or more computer aided design templates to use in fabrication; measuring a straight arm of the physical door hydraulic piston to produce a measurement M1; measuring from the outside edge of the straight arm to an outside edge of an angled arm of the hydraulic piston to produce a measurement M2; measuring a width of a pivot point of the hydraulic piston to produce a measurement M3; measuring the collective height of the straight arm and the angled arm to produce a measurement M4; selecting one of the templates from the two or more templates based on the comparing step; entering measurements M1, M2, M3 and M4 into the selected template to produce fabrication specifications; based on the fabrication specifications, fabricating a customized apparatus for holding a door closed, comprising: top panel; a left wall; a right wall; a flap attached to the left wall opposite the top panel and folded under the apparatus; a flap attached to the right wall opposite the top panel and folded under the apparatus; a front end; a back end; and an opening at the front end that has a larger cross section than a cross section of the back end thereby providing for a tapered shape of the apparatus overall, such that the apparatus is configured to fit over two hinged arms of a door closing system, preventing the arms from articulating open to prevent the door from opening.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Figure 1:
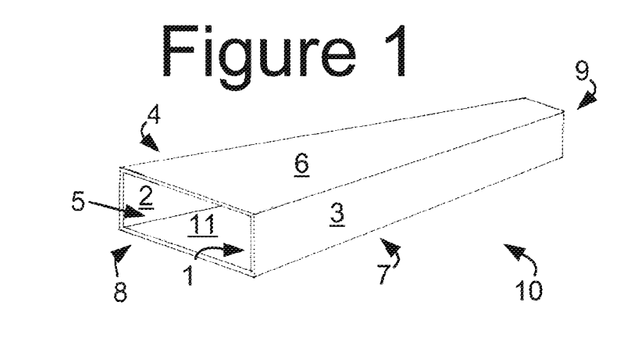
FIG. 1 is a right front perspective view of a door collar lock according to one exemplary embodiment of the present invention.

Broadly, embodiments of the present invention generally provide a door collar lock that can be easily installed over the rods of a pneumatic door mechanism to prevent entry. With reference to FIG. 1, a right front perspective view of a door collar lock 10 is shown according to one embodiment. In one embodiment, the door collar lock 10 may comprise a front end 8, a back end 9, a left wall 4 (having an inner wall 2), and a right wall 3 (having an inner wall 1). The front end 8 may comprise an opening 5, which may have a planar area that may be smaller than the cross section of the front end 9, providing for a tapered shape of the door collar lock 10 overall.

The relative triangular shapes of a top panel 6 of the door collar lock 10, and a bottom panel 7 illustrate the tapering from back to front of the door collar lock 10, as also illustrated in the partial view of the inner wall 11 of the bottom panel 7.

Figure 2:
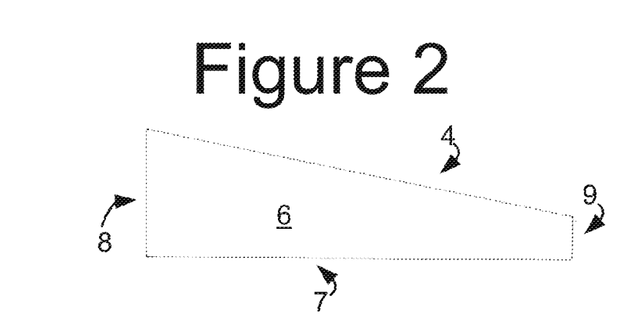
FIG. 2 is a top elevational view of the embodiment of FIG. 1.

With reference to FIG. 2, a top elevational view of the door collar lock 10 of FIG. 1 is shown. The tapered shape of the door collar lock 10 is illustrated in FIG. 2, more specifically as illustrated by the shape of the top panel 6.

Figure 3:
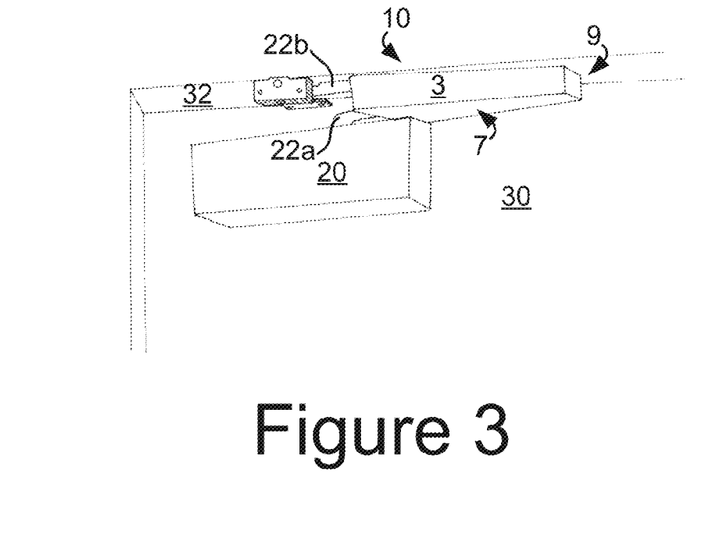
FIG. 3 is a left perspective view of a door with the door collar lock according to the embodiment of FIG. 1.

With reference to FIG. 3, a left perspective view of a door 30 with a pneumatic or spring actuated arm and rod configuration is shown, with the door collar lock 10 installed to prevent the door 30 from opening according to the embodiment of FIG. 1. The rod or elbow 22a and 22b may consist of two articulating elongated members 22a and 22b over which the door collar 10 may be fitted by insertion over the elongated members 22a and 22b. Normally, the two elongated members 22a and 22b are free to articulate as allowed or caused by the pneumatic, hydraulic, or spring piston 20. While the piston 20 may bias the elongated members 22a and 22b to push the door 30 into the closed position with respect to the door frame 32, such a bias toward closing does not function as a lock. A person of average or low strength may still push the door open with little or no effort, as designed. However, in an emergency situation, it may be desirable to push the door collar lock 10 over the arms 22a and 22b.

Figure 4:
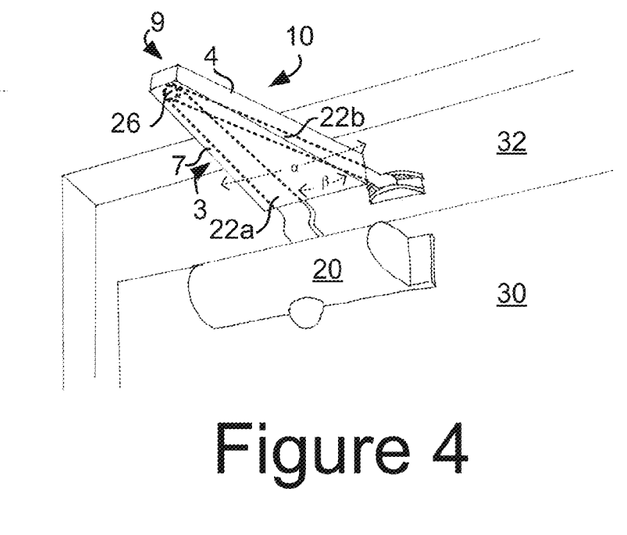
FIG. 4 is a bottom right perspective view of a door with the door collar lock according to the embodiment of FIG. 1.
Figure 5:
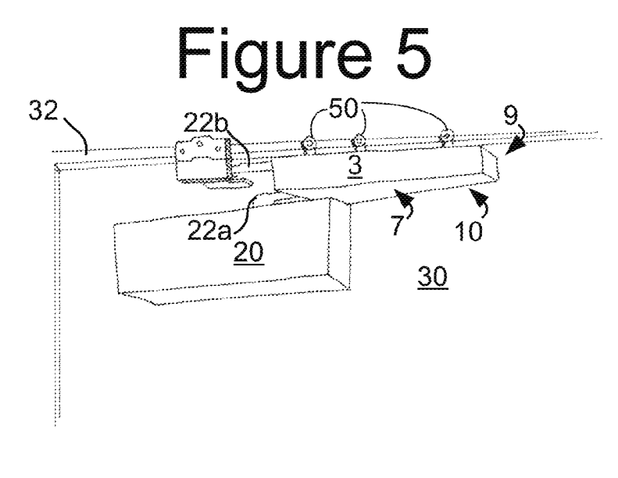
FIG. 5 illustrates a door collar lock according to an alternative embodiment of the present invention.

With reference to FIG. 4, a bottom right perspective view of the door collar lock 10 installed to prevent the rods 22a and 22b from scissoring outwardly to a more oblique angle $\alpha$ so as to prevent opening of the door 30 is shown. The rods 22a and 22b are shown in phantom for the portion covered by the door collar lock 10, and the hinge 26 between the rods 22a and 22b is further illustrated in phantom. The door collar lock 10 functions to keep the rods 22a and 22b at a relatively more acute angle $\beta$ rather than when the door 30 is in the open position with respect to the frame 32. In one embodiment, the angle $\beta$ comprises an angle by which the door 30 is substantially in a closed position with respect to the door frame 32, so as to prevent entry by a potential wrong doer in an emergency. In one embodiment, the angle $\alpha$ comprises a wider angle than angle $\beta$, so as to prevent or deter a wrong doer from entry in an emergency.

As shown in FIG. 4, the elongated design of the sides 3 and 4 of the door collar lock 10 functions to provide a distributed pressure along some or most of the length of the rods 22a and 22b when there is attempt to force the door 30 open. Having this elongated length and pressure along the rods 22a and 22b, as opposed to just one small portion of the rods 22a and 22b, makes for a more rigid stoppage of the door 30 from opening. The larger area of distribution of the pressure along the sides 3 and 4, and the planar surface areas of the top (6 in FIGS. 1 and 2) and bottom 7 of the door collar lock 10 further provides more rigidity.

Put another way, the left wall 3 and the wall 4 are configured at an angle with respect to each other so as to contact a relative substantial part of side surface areas of the arms 22a and 22b for increased distribution of force placed by the arms on the apparatus 10 as opening force is placed on the door 30. In this respect, the top 6 and bottom 7 comprise solid substantially triangular plates so as to further distribute the force placed on the apparatus 10 by the arms 22a and 22b as opening force is placed on the door 30.

FIGS. 5-9 illustrate various embodiments that provide for various storage solutions for the door collar lock 10. Storage at or in the general area of the door collar lock 10 may prevent, for example, a teacher in a classroom, or manager in an office, from having to search for the door collar lock 10 in an extreme panic during an emergency. For example, with specific reference to FIG. 5, an alternative embodiment of the door collar lock 10 includes wheels 50 on small carriages configured to roll along a mount on the door frame 32, on the side of one of the rods 22a and 22b, or on one of the rods 22a itself. The door collar lock 10 can then be stored to the side of the rods 22a and 22b when not in use, but then rolled into position when the door 30 is closed, over both of the rods 22a and 22b, during an emergency when in use, as shown in position in FIG. 5.

Figure 6:
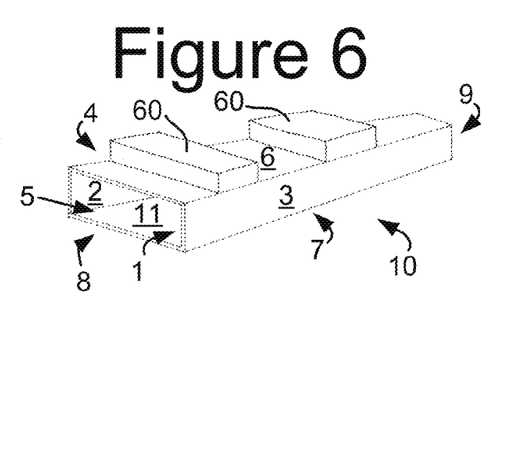
FIG. 6 illustrates a door collar lock according to another alternative embodiment of the present invention.

With reference to FIG. 6, yet another alternative embodiment of the door collar lock 10 is shown with one or more magnets 60 attached to the top 6 as a mounting mechanism. In this embodiment, the door collar lock 10 may be magnetically attached to a steal structure, such as the door 30 or door frame 32 when not in use, but remain easily accessible during an emergency.

Figure 7:
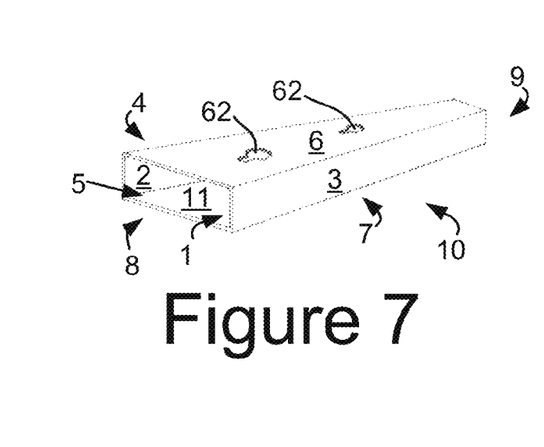
FIG. 7 illustrates according to another alternative embodiment of the present invention.

With reference to FIG. 7, yet another alternative embodiment of the door collar lock 10 is shown with one or more wall mounting holes 70 located in the top 6 as a mounting mechanism. As with the magnets 60 in FIG. 6, the wall mounting holes 70 allow the door collar lock 10 to be position mounted in proximity to the door 30 by means of one or more nails or mounting brackets in the door 30 or wall near the door.

Figure 8:
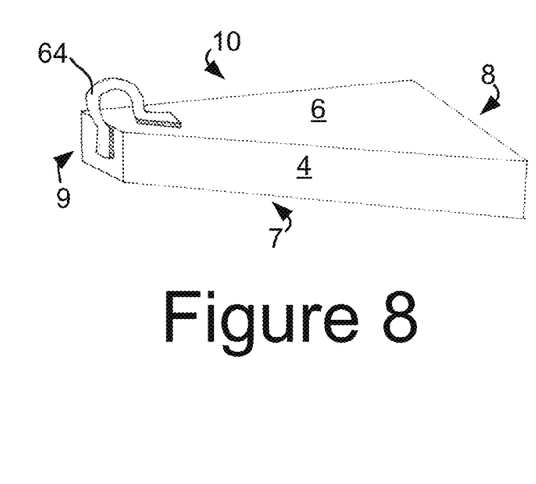
FIG. 8 illustrates according to another alternative embodiment of the present invention.

With reference to FIG. 8, yet another alternative embodiment of the door collar lock 10 is shown with a mounting hook 64 located in the top 6 as a mounting mechanism. The wall-mounting hook 64 allows the door collar lock 10 to be position mounted in proximity to the door 30 by means of a nail or mounting bracket in the door 30 or wall near the door.

Figure 9:
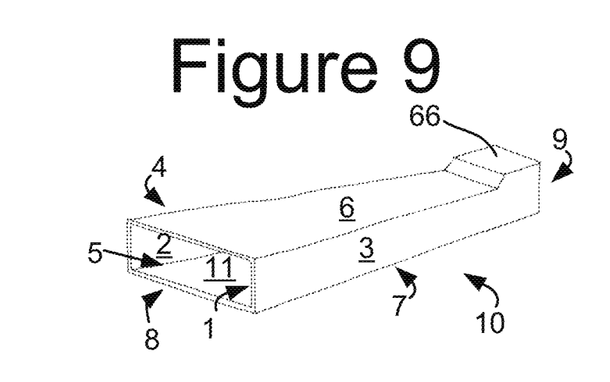
FIG. 9 illustrates a door collar lock according to another alternative embodiment of the present invention.

With reference to FIG. 9, yet another alternative embodiment of the door collar lock 10 is shown with a knob 66 to allow for more clearance for the hinge 26 within the device 10 when mounted on the elbows or arms 22a and 22b.

Figure 10:
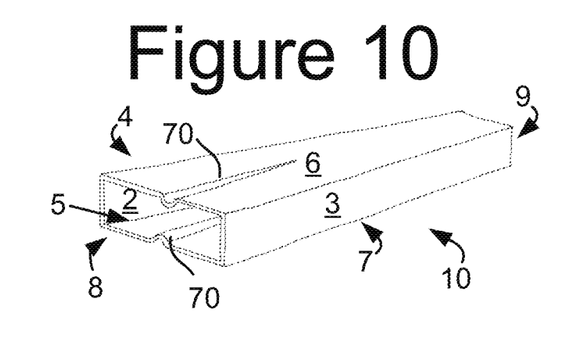
FIG. 10 illustrates a door collar lock according to other alternative embodiment of the present invention.

With reference to FIG. 10, yet another alternative embodiment of the door collar lock 10 is shown with a bevel 70 that may allow the device 10 to be more easily tightened around smaller sized arms 22a and 22b.

Figure 11:
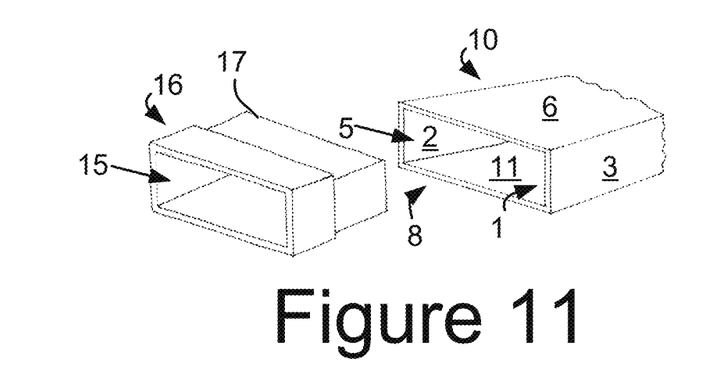
FIG. 11 illustrates a door collar lock according to another alternative embodiment of the present invention.

With reference to FIG. 11, yet another alternative embodiment of the door collar lock 10 is shown with an extension or insert 16 having a ridge configured to slide into the opening 5 of the device 10 to extend the length of the device 10 for adjustment for shorter or longer arms 22a and 22b. After the extension 16 is inserted into the opening 5, the arms 22a and 22b are fit through the extension's opening 15.

Figure 12:
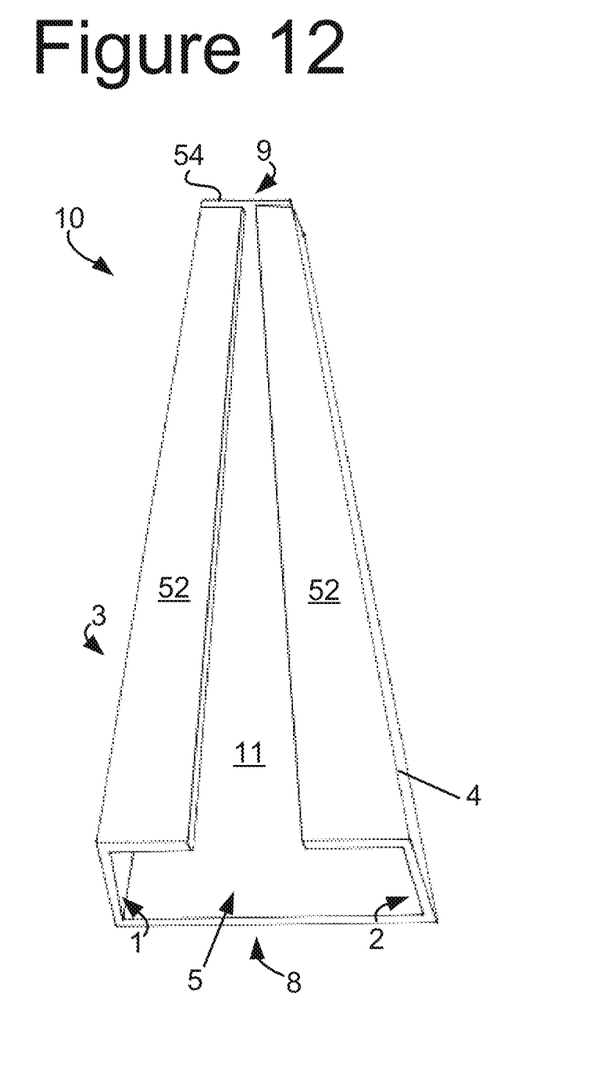
FIG. 12 is a bottom, front perspective view of a door collar lock according to another alternative embodiment of the present invention.

With reference to FIG. 12, a bottom, front perspective view of an alternative embodiment of the door collar lock 10 is shown. The embodiment of FIG. 12 may comprise an embodiment that eliminates any need for welding of the door collar lock 10. Instead of a having a solid bottom panel 7 as in the embodiments of FIGS. 1-11, the embodiment of FIG. 12 has a portion of the bottom panel cut out, with instead, two flaps 50 that extend from the sides 3 and 4 of the lock 10, bent into the bottom of the lock 10.

Figure 13:
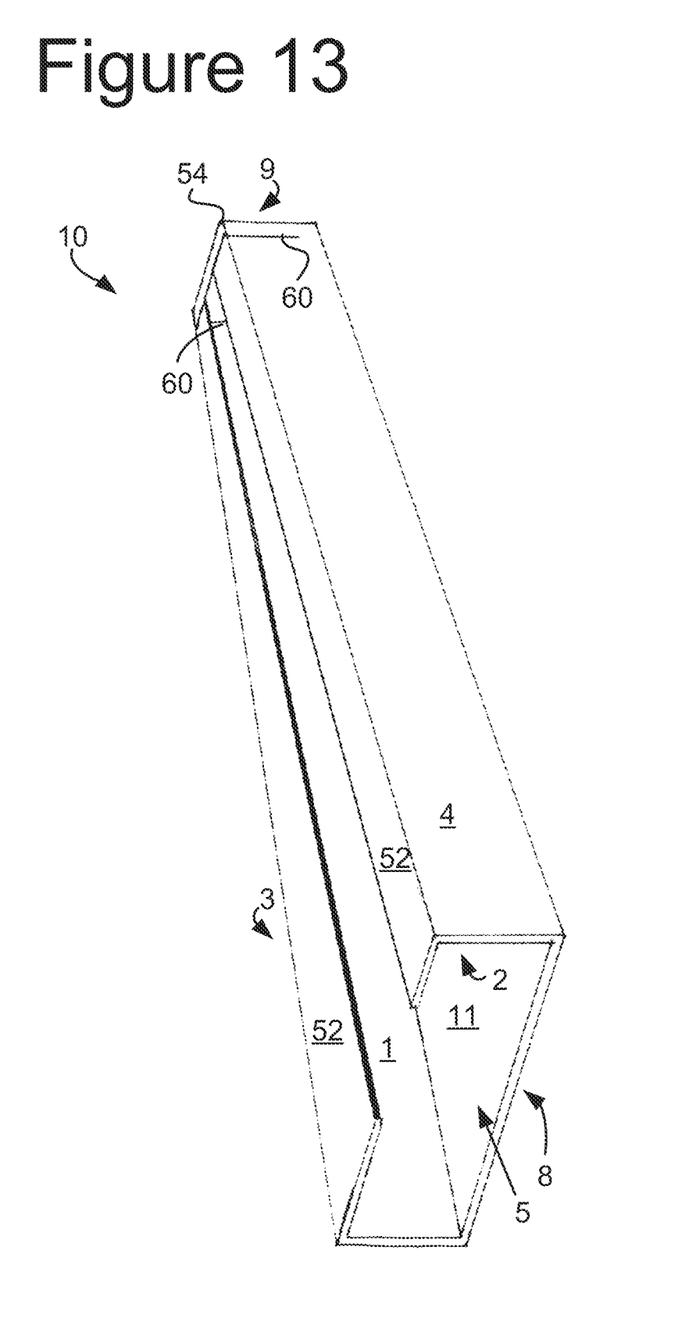
FIG. 13 is a bottom left perspective view of the embodiment of FIG. 12.

With reference to FIG. 13, a bottom left perspective view of the embodiment of FIG. 12 is shown. The top 9 of the door collar lock 10 may comprise an end cap 52 that is extended from the bottom panel 7, and which may not be directly connected to the sides 3 and 4 of the lock 10 for ease of manufacturing, which may result in slits 60 down the sides of the end cap 54 between the sides 3 and 4 and the end cap 54. Optionally, the end cap 54 may be attached, welded, or glued to the sides 3 and 4 after shaping of the lock 10 during manufacturing.

The embodiment of FIGS. 12 and 13 may allow the door collar lock 10 to be made by brake-pressing it. The whole pattern can be laid flat (from one geometric shape) and cut by a laser. Next, a brake machine may make five brakes to fold the finished brake press lock 10. There may be, for example, one brake for the end cap 54, and another brake for each side 3 and 4, and another two breaks to fold the flaps 52 that form the open channel on the bottom. This embodiment may cut down significantly on costs of manufacturing, without compromising strength. In this respect, in one embodiment, it may be advantageous to use a gauge of steel of sufficient thickness for the rigidity to cause toe creases or brakes in the lock 10 to remain substantially permanent during use to hold when the lock 10 is put under duress.

Figure 14:
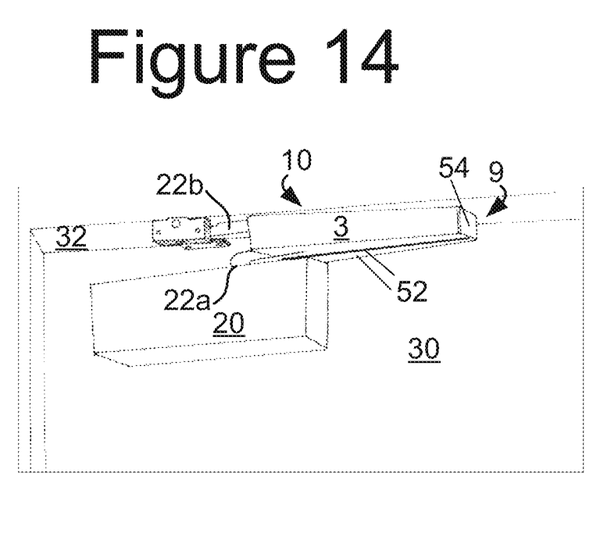
FIG. 14 is a left perspective view of a door having a door collar lock according to the embodiment of FIGS. 12 and 13.

With reference to FIG. 14, a left perspective view of a door with a pneumatic or spring actuated arm and rod configuration, with the embodiment of FIGS. 12 and 13 installed to prevent the door from opening is shown. As shown in FIG. 14, even in the absence of a solid bottom 7 as with the embodiment of FIG. 3, the flaps 52 still provide enough force over the arms 22a and 22b to prevent a person from pushing the door open when the embodiment of FIG. 14 is installed over the arms 22a and 22b, functioning in the same way as the embodiment of FIG. 3.

Method and System for Customization

Figure 15:
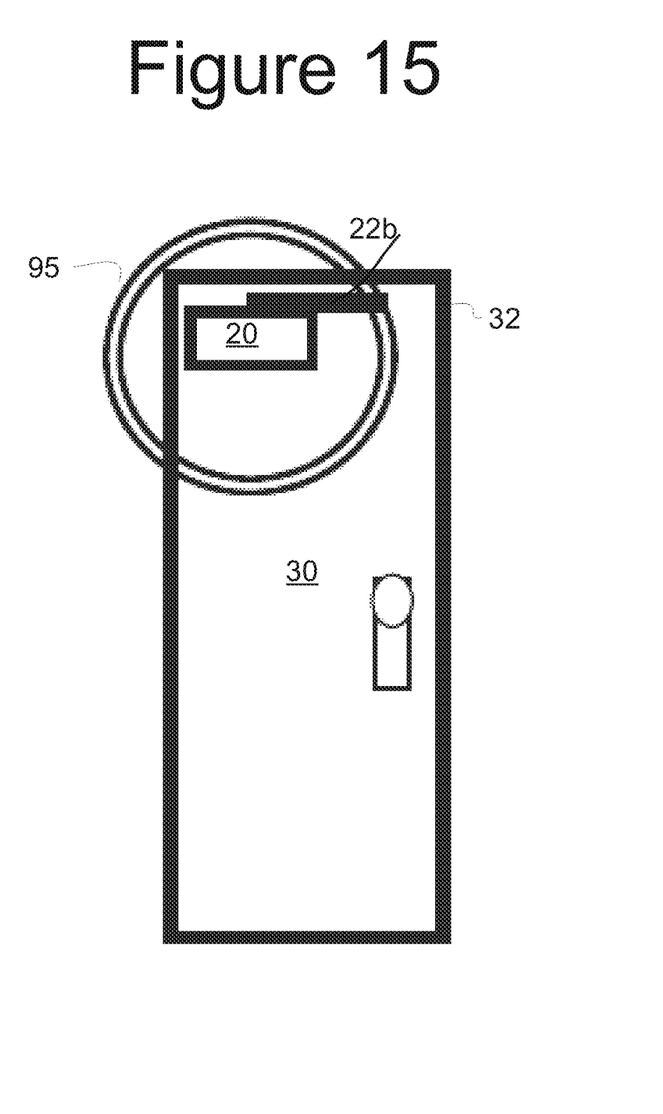
FIG. 15 is a full-front elevational view of typical door with a door collar lock according to the present invention.

With reference to FIG. 15, a full-front elevational view of typical door with a hydraulic, or spring piston 20 to bias the elongated members (e.g. 22b). In a system and method for customization, a first step may be to locate the position of the hydraulic piston 20 where the door collar lock 10 may be installed, as indicated by the circle 95.

Figure 16:
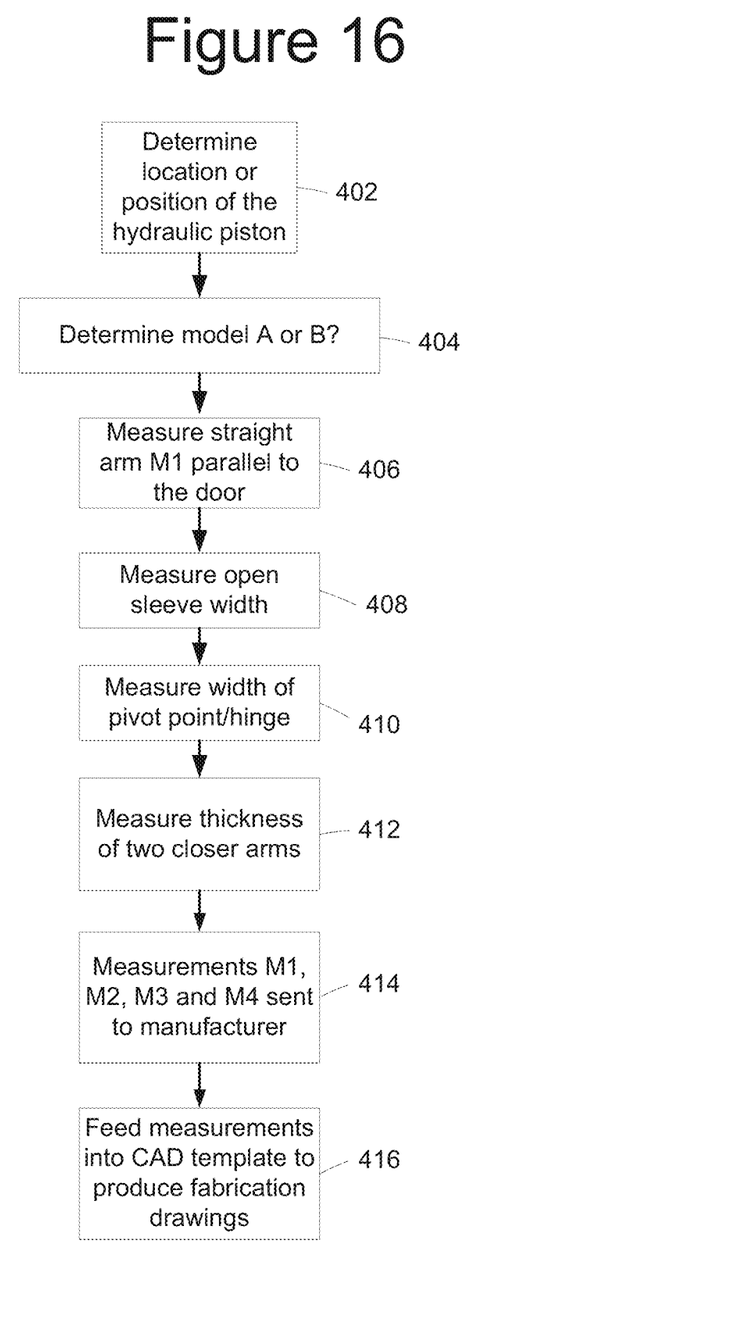
FIG. 16 is a flow diagram that illustrates steps performed in a process to make a customized door collar lock according to the present invention.

In this regard, this first step may also be thought of as the first step to customizing a door collar lock 10. With reference to FIG. 16, a flow diagram illustrates steps performed in a process to make a customized door collar 10 according to one embodiment. In step 402, a potential user (customer) of the door collar 10 may determine location or position of the hydraulic piston 20 (as illustrated in FIG. 15 by the circle 95).

Figure 17:
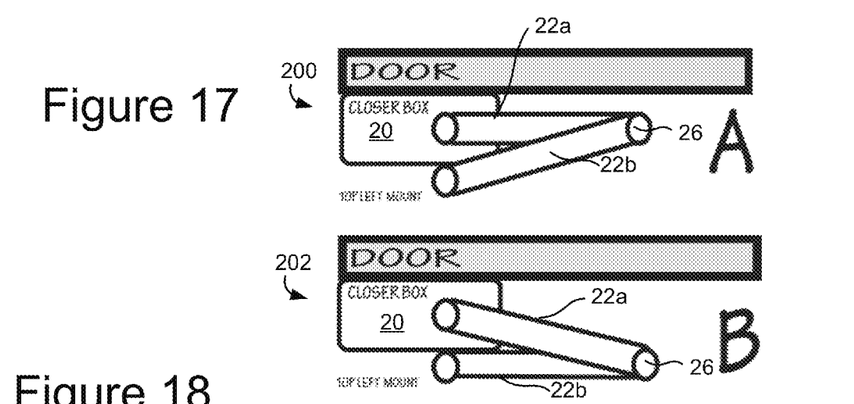
FIG. 17 is a diagram illustrating two possible left mount hydraulic configurations.

In step 406, the customer may compare their door and hydraulic piston configuration to a diagram of left and right pictorial configurations. With reference to FIG. 17, two possible left mount hydraulic configurations are shown. For example, there may be an A configuration 200 of the left mount hydraulic arm, and a B configuration 202, by which the user can view his or her hydraulic arm 20 and selected from the A configuration 200 and B configuration 202.

Figures 18, 19, 20, 21:
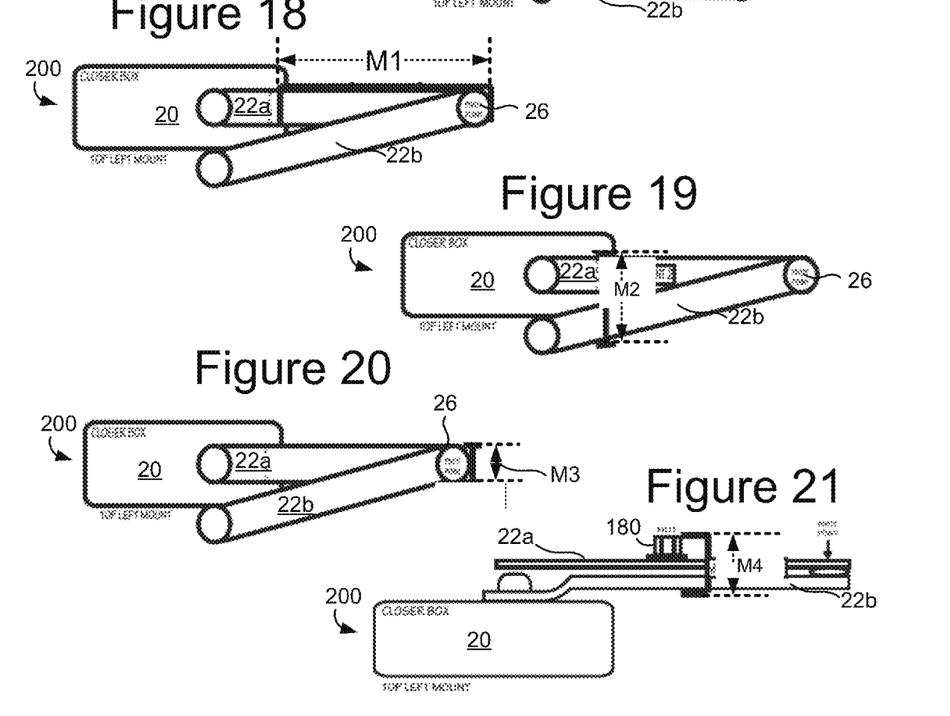
FIG. 18 is a top elevational view of the hydraulic arm configuration shown in FIG. 17.
FIG. 19 is another top elevational view of the hydraulic mount configuration in FIG. 17.
FIG. 20 is another top elevational view of the hydraulic mount configuration in FIG. 17.
FIG. 21 is a side view of the mount configuration of FIG. 17.

Referencing back to FIG. 16, in step 406, the customer may then take a measurement of the straight arm 22a that is substantially parallel to the door 30 (when the door is in the closed position). With reference to FIG. 18, a top elevational view of the model A type hydraulic arm 20 is shown, with indications M1 of where the customer should measure the straight arm 22a that is substantially parallel to the door 30. In step 406, the measurement M1 is the length of the straight arm 22a, starting at the outside edge of the pivot point or hinge 26 to a half inch to one inch before the first obstruction (bend or closer box).

In step 408, the customer may perform an open sleeve measurement. With reference to FIG. 19, another top elevational view for the hydraulic arm of FIG. 18 showing where the customer should measure a length of the open sleeve M2. The measurement M2 is for the opening of the door collar 10. The customer may measure from the outside edge of the straight arm 22a to the outside edge of the angled arm 22b. In one embodiment, for the most accurate measurement, the customer may make the tape measure or ruler completely perpendicular to the door 30 to provide a snug fit for the door collar 10.

With reference back to FIG. 16, in step 410, the user may measure the width of the pivot point or hinge 26. With reference to FIG. 20, another top elevational view for the hydraulic arm 20 of FIG. 18 showing where the customer should measure a length of the pivot or hinge 26 is shown. The customer may measure the length as shown by M3 of FIG. 20.

With reference back to FIG. 16, in step 412, the user may take the measurement of the thickness or collective height of the two closer arms 22a and 22b at a thickest point (usually at the hinge). With reference to FIG. 21, front elevational view for the hydraulic arm 20 of FIG. 18 showing where the customer should measure the two closer arms 22a and 22b is shown. This measurement M4 may be from the highest and lowest points of the closer arms 22a and 22b. If a nut or knob 180 adds thickness to the arms 22a and 22b, then the measurement M4 may include this thickness.

In step 414, the customer may transmit the measurements to the manufacturer. Transmission may be through electronic means, or by filling out an HTML form on the internet.

In step 416, the manufacturer may take the received measurements, M1, M2, M3, and M4, and plug them into a CAD template. CAD templates are widely available as known by those of skill in the art. They allow manufacturers to create a template of a device, and devise different sizes by defining measurements of certain parts of the template in the CAD system. The CAD system can then proportionally and automatically re-size the CAD object, and produce fabrication specifications for the fabrication machine or fabricator, which may using, by way of example, and not by way of limitation, lazar cutting of metal to produce the object. Such CAD systems that allow this type of templating are available from many sources, including PTC Creo by PTC, Inc. of Needham, Mass. 02494, USA.

With reference to FIG. 20, a CAD template 300 that may be used for customization of the door collar lock 20 is shown. A template table 350 may provide an entry interface for entering the received measurements M1, M2, M3, and M4. The template may then adjust the proportional sizes of the object in the template to produce a manufacturing fabrication file, for example, in the form of a drawing interchange format or drawing exchange format (DXF) that can be used by the fabrication machinery to produce the door collar lock 20.

It should be understood, of course, that the foregoing relates to exemplary embodiments of the invention and that modifications may be made without departing from the spirit and scope of the invention as set forth in the following claims.

The invention claimed is:

1. A method for creating a customized apparatus for holding a door closed, comprising; comparing a physical door hydraulic piston to two or more diagrammatic configurations to determine which of two or more computer aided design templates to use in fabrication; measuring a straight arm of the physical door hydraulic piston to produce a measurement M1; measuring from an outside edge of the straight arm to an outside edge of an angled arm of the hydraulic piston to produce a measurement M2; measuring a width of a pivot point of the hydraulic piston to produce a measurement M3; measuring a collective height of the straight arm and the angled arm to produce a measurement M4; selecting one of the templates from the two or more templates based on the comparing step; entering measurements M1, M2, M3 and M4 into the selected template to produce fabrication specifications; based on the fabrication specifications, fabricating a customized apparatus for holding a door closed, comprising: a top panel; a left wall; a right wall; a flap attached to the left wall opposite the top panel and folded under the apparatus; a flap attached to the right wall opposite the top panel and folded under the apparatus; a front end; a back end; and an opening at the front end that has a larger cross section than a cross section of the back end thereby providing for a tapered shape of the apparatus overall, such that the apparatus is configured to fit over two hinged arms of a door closing system, preventing the arms from articulating open to prevent the door from opening.

2. The method of claim 1, wherein the top panel comprises a solid substantially triangular plate so as to further distribute the force placed on the apparatus by the arms as opening force is placed on the door.

3. The method of claim 2, wherein the top panel further comprises a mounting system.

4. The method of claim 3, wherein the mounting system comprises a wall-mounting hook.

5. The method of claim 3, wherein the mounting system comprises one or more magnets.

6. The method of claim 3, wherein the mounting system comprises one or more mounting holes.

7. The method of claim 3, wherein the mounting system comprises one or more wheels and carriages configured to allow the apparatus to be slid over the arms.

8. The method of claim 1, wherein the top panel further comprises a bevel.

9. The method of claim 1, wherein the top panel further comprises an extension that is configured to fit in an opening at the front end.

* * * * *